United States Patent [19]

Baillargeon et al.

[11] Patent Number: 5,080,690

[45] Date of Patent: Jan. 14, 1992

[54] POLYMER SUPPORTED 1-ALKYL-N,N-DIALKYL AMINOALCOHOLS AND FUEL COMPOSITIONS CONTAINING SAME

[75] Inventors: David J. Baillargeon, Cranbury; Angeline B. Cardis, Florence; Susan W. Johnson, Marmora, all of N.J.; Carl E. Shanholtz, Ridgeley, W. Va.

[73] Assignee: Mobil Oil Corp., Fairfax, Va.

[21] Appl. No.: 459,086

[22] Filed: Dec. 29, 1989

[51] Int. Cl.$^5$ .................................................. C10L 1/22
[52] U.S. Cl. ..................................... 44/391; 44/333; 44/386; 44/392; 44/399; 44/434
[58] Field of Search ................ 44/331, 386, 399, 434, 44/391, 392

[56] References Cited

U.S. PATENT DOCUMENTS 2,974,023  3/1961  Cyba et al. ............................ 44/386

*Primary Examiner*—Prince E. Willis
*Assistant Examiner*—M. Nuzzolillo
*Attorney, Agent, or Firm*—Alexander J. McKillop; Charles J. Speciale; Howard M. Flournoy

[57] ABSTRACT

Products of reaction between 1-alkyl-N,N-dialkyl ethanolamines and copolymers of maleic anhydride are new additives which are effective in lowering the cloud point of distillate fuels.

23 Claims, No Drawings

POLYMER SUPPORTED 1-ALKYL-N,N-DIALKYL AMINOALCOHOLS AND FUEL COMPOSITIONS CONTAINING SAME

BACKGROUND OF THE INVENTION

This patent application is directed to an invention comprising a liquid fuel composition containing additive amounts of polymer supported amino alcohols. These novel additives improve the flow properties of such fuels.

Traditionally, the low-temperature properties of distillate fuels have been improved by the addition of kerosene, sometimes in very large amounts (5-70 wt %). The kerosene dilutes the wax in the fuel, i.e., lowers the overall weight fraction of wax, and thereby lowers the cloud point. The additives of this invention effectively lower the cloud point of distillate fuel without any appreciable dilution of the wax component.

Other additives known in the art have been used in lieu of kerosene to improve the low-temperature properties of distillate fuels. Many such additives are polymeric materials with pendent fatty hydrocarbon groups, and are usually derived from the free radical polymerization of unsaturated hydrocarbons (olefins, acrylates, fumarates, etc.). These additives are limited in their range of activity, however; most improve fuel properties by lowering the pour point and/or filterability temperature. These same additives have little or no effect on the cloud point of the fuel.

Many additives for reducing the pour point and/or filterability temperature are known which are derived from free radical polymerization of carbon-carbon double bond containing compounds. These new additives are distinct from those known in that the new additives are effective in lowering the cloud point of diesel fuels but are not effective in lowering the pour point of diesel fuels. Thus these new additives are unique in their function to improve the low-temperature flow properties of such fuels. These compounds are structurally different from other compounds known to lower the cloud point of distillate fuels, especially in that the amino alcohol is supported on a polymer.

The new additives incorporate, for example, a 1-alkyl-N,N-dialkyl ethanolamine into the preformed polymer. Pour point additives are not known to possess this type moiety. Thus these new additives are unique in chemical composition.

SUMMARY OF THE INVENTION

Fuel compositions comprising a major amount of a liquid hydrocarbon fuel and a minor amount of an additive product of reaction obtained by reacting a 1-alkyl-N,N-dialkyl amino alcohol with polymers and/or oligomers containing maleic anhydride are disclosed.

Products of the reaction between 1-alkyl-N,N-dialkyl ethanolamine and copolymers of maleic anhydride have been prepared and diesel fuels containing as little as 500 ppm of such compounds exhibit lower cloud points than the corresponding diesel fuels containing no such additive.

The 1-alkyl-N,N-dialkyl ethanolamines are the reaction products from the condensation of dialkylamines and 1,2-epoxyalkanes. The copolymers of maleic anhydride may be copolymers with alpha-olefins, styrene, acrylates, methacrylates, or other carbon-carbon double bond containing compounds.

An object of this invention is to provide additives, for distillate fuel compositions having improved low-temperature flow properties, comprising polymer supported aminoalcohols. To the best of applicants' knowledge and belief both the polymer supported aminoalcohols and fuel compositions thereof were unknown heretofore.

DESCRIPTION OF SPECIFIC EMBODIMENTS

The additives in accordance with the present discovery are the products of the reaction between alkanolamines such as 1-alkyl-N,N-dialkyl ethanolamines and polymers and/or oligomers containing maleic anhydride.

The 1-alkyl-N,N-dialkyl ethanolamines are the product of the reaction between 1,2-epoxyalkanes and N,N-dialkylated amines. The epoxyalkanes may be of any size but preferably contain 16 to 24 carbons. The alkyl groups on the amine may be of any size but preferably each contain 16 to 24 carbons. The two alkyl groups on the amine need not be the same. The reaction between the amine and the epoxide may be run with or without solvent. The reaction temperature may be from about 25° to about 350° C. An example of a 1-alkyl-N,N-dialkyl ethanolamine is illustrated below. This example is merely illustrative and is not meant to limit the nature of the 1-alkyl-N,N-dialkyl ethanolamines in this disclosure.

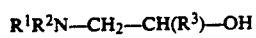

$R^1R^2N-CH_2-CH(R^3)-OH$ where $R^1$, $R^2$, $R^3$ are hydrocarbyl groups, each having from 1 to about 60 carbon atoms.

The polymers utilized in this discovery are copolymers of maleic anhydride with other unsaturated hydrocarbons. The other comonomer may be alpha olefin having 2 to 30 carbons, an acrylate ester, a methacrylate ester, styrene, or any combination thereof. The polymers may range in size from oligomeric to 200,000 molecular weight.

The reaction between the 1-alkyl-N,N-dialkyl ethanolamine and the maleic anhydride-derived copolymer may be performed with or without solvent. The reaction temperature may be from about 50° to about 400° C. The reaction is generally performed using a 1:1 ratio of aminoalcohol to maleic anhydride moiety. Under these conditions, the reaction is run until the anydride is no longer evident in the infrared spectrum. Alternately, the ratio of aminoalcohol to maleic anhydride moiety may range from 2:1 to about 1:5. The structure of the product is not absolutely certain, however, the presumed product of the reaction is illustrated below:

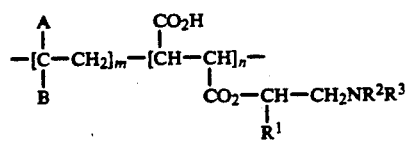

Where
A = hydrogen, Me;
B = hydrogen, $C_1$ to about $C_{60}$ hydrocarbyl, carboxyhydrocarbyl or phenyl group;
$R^1$, $R^2$, $R_3$, each are independently $C_1$ to about $C_{60}$ hydrocarbyl groups;
m, n = 2 to 1000, independently.

This illustration is merely exemplary and does not necessarily describe all of the possible reaction products which may be produced. The illustration is not meant to limit the nature of the products.

At the completion of the reaction the solvent, if used, may be distillatively removed. Alternately, the solvent may be allowed to remain with the reaction product so as to produce a concentrate of the product in the solvent.

Any suitable hydrocarbon solvent may be used such as xylene or mixed xylenes, toluene, benzene and methyl ethyl ketone.

In general, the reaction products of the present invention may be employed in fuel compositions in any amount effective for imparting thereto the desired degree of activity to improve the low temperature characteristics of distillate fuels. In many applications the products are effectively employed in amounts from about 0.001% to about 10% by weight and preferably from less than 0.1% to about 5% of the total weight of the composition. Effective amounts of the additive may be incorporated into the fuel composition by adding thereto from 25 to 50 pounds of additive per 1000 barrels of fuel. These additives may be used in conjunction with other known low-temperature fuel additives (dispersants, etc.) being used for their intended purpose.

The fuels contemplated are liquid hydrocarbon combustion fuels, including the distillate fuels and fuel oils. Accordingly, the fuel oils that may be improved in accordance with the present invention are hydrocarbon fractions having an initial boiling point of at least about 250° F. and an end-boiling point no higher than about 750° F. and boiling substantially continuously throughout their distillation range. Such fuel oils are generally known as distillate fuel oils. It is to be understood, however, that this term is not restricted to straight run distillate fractions. The distillate fuel oils can be straight run distillate fuel oils, catalytically or thermally cracked (including hydrocracked) distillate fuel oils, or mixtures of straight run distillate fuel oils, naphthas and the like, with cracked distillate stocks. Moreover, such fuel oils can be treated in accordance with well-known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will lie between about 250° F. and about 750° F. Obviously, the distillation range of each individual fuel oil will cover a narrower boiling range falling, nevertheless, within the above-specified limits. Likewise, each fuel oil will boil substantially continuously throughout its distillation range.

Contemplated among the fuel oils are Nos. 1, 2 and 3 fuel oils used in heating and as diesel fuel oils, and the jet combustion fuels. The domestic fuel oils generally conform to the specification set forth in A.S.T.M. Specifications D396-48T. Specifications for diesel fuels are defined in A.S.T.M. Specification D975-48T, Typical jet fuels are defined in Military Specification MIL-F-5624B.

The following examples are illustrative only and are not intended to limit the scope of the invention.

EXAMPLE 1

Preparation of 1-hexadecyl-N,N-di(hydrogenated tallow) ethanolamine 1050.4 gm (2.012 mol) of di(hydrogenated tallow)amine, 564.4 gm (2.102 mol) of 1,2-epoxy octadecane, and 1.5 L of mixed xylenes were combined in a 5 L reactor equipped with a mechanical stirrer, thermometer, condenser, and $N_2$ purge. The mixture was heated to reflux for four hours. The condenser was replaced with a distillation head and the xylenes were removed distillatively at 130° to 210° C. with a rapid flow of $N_2$. The reaction produced 1612.3 gm of slightly yellow solid.

EXAMPLE 2

Preparation of Additive A 120 ml of hexadecene (0.42 mol), 20.8 gm of maleic anhydride (0.212 mol), 6.0 gm (0.055 mol) of azobisisobutyronitrile, and 175 ml of mixed xylenes were combined in a 500 ml reactor fitted with a mechanical stirrer, thermometer, condenser, and $N_2$ purge. The mixture was heated to 55° to 65° C. for two hours and then to 95° C. for three hours. The solvent was evaporatively distilled to yield 115.4 gm of a thick brown syrup.

35.67 gm (0.0652 mol with respect to maleic anhydride) of the brown syrup, 51.5 gm (0.0651 mol) of the product from Example 1, and 100 ml of mixed xylenes were combined in a 250 ml reactor fitted with a mechanical stirrer, thermometer, condenser, and $N_2$ purge. The mixture was heated to reflux for four hours. The solvent was evaporatively distilled to yield 81.69 gm of amber colored solid.

EXAMPLE 3

Preparation of Additive B 53.2 gm (0.542 mol) of maleic anhydride, 80.0 ml (0.558 mol) of butyl acrylate, 11.3 gm (0.0830 mol) of azobisisobutyronitrile, and 375 ml of toluene were combined in a 1 liter reactor fitted with a mechanical stirrer, thermometer, condenser, and $N_2$ purge. The mixture was warmed to 60° C. over one and one-half hours and maintained at 55° to 60° C. for six hours. The temperature was then raised to 100° C. for two hours. The solvent was evaporatively distilled to yield 123.1 gm of black syrup.

36.02 gm (0.159 mol with respect to maleic anhydride) of this syrup, 126.3 gm (0.160 mol of the product from Example 1, and 50 ml of mixed xylenes were combined in a 250 ml reactor fitted with a mechanical stirrer, thermometer, condenser, and $N_2$ purge. The mixture was heated to 160° C. for four hours. The solvent was evaporatively distilled to yield 150.1 gm of brown solid.

EXAMPLE 4

Preparation of Additive C 165.0 gm (0.501 mol) of stearyl methacrylate, 49.0 gm (0.50 mol) of maleic anhydride, 10.0 gm (0.073 mol) of azobisisobutyronitrile, and 100 ml of mixed xylenes were combined in a reactor fitted with a mechanical stirrer, thermometer, condenser, and $N_2$ purge. The mixture was slowly warmed to 90° C. and maintained at 85° to 95° C. for five hours. The solvent was evaporatively distilled to yield 211.4 gm of amber syrup.

30.0 gm (0.070 mol with respect to maleic anhydride) of this syrup and 100.0 gm (0.0126 mol) of the product from Example 1 were combined in a 300 ml reactor fitted with a mechanical stirrer, thermometer, condenser, and $N_2$ purge. The mixture was heated to 130° C. for 17 hours. The solvent was evaporatively distilled to yield a brown solid.

EXAMPLE 5

Preparation of Additive D 25.0 gm (0.123 mol with respect to maleic anhydride) of a 1600 molecular weight 50:50 copolymer of maleic anhydride and styrene, 100.0 gm of the product from Example 1, and 100 ml of ethyl methyl ketone were combined in a reactor fitted with a mechanical stirrer, thermometer, condenser and $N_2$ purge. The mixture was heated to 90° C. for five hours. The condenser was fitted with a Dean-Stark trap through which the solvent was removed as the reaction temperature was raised to 230° C. for three hours. The product was dried in a vacuum oven at 230 to 300 mmHg and 150° C. for 16 hours to yield a yellow solid.

EXAMPLE 6

Preparation of Additive E 13.0 gm (0.103 mol with respect to maleic anhydride) of a 50:50 copolymer of ethylene and maleic anhydride, 80.0 gm (0.101 mol) of the product from Example 1, and 75 ml of mixed xylenes were combined in a reactor fitted with a mechanical stirrer, thermometer, condenser, and $N_2$ purge. The mixture was heated to 150° C. for six hours. The solvent was evaporated and the resin dried in a vacuum oven at 230 to 300 mmHg at 100° C. for four days to yield a yellow solid.

Preparation of Additive Concentrate

Concentrates were prepared by dissolving 10 gm of additive in enough mixed xylenes to make a total volume of 100 ml.

Cloud Point Testing

Cloud points were determined using an automatic cloud point test based on the commercially available Herzog cloud point tester.

Two diesel fuels, designated "Diesel Fuel 1" and "Diesel Fuel 2" were used for testing the effect of the new additives on cloud point. The fuels were treated with 500 ppm of the additives. The cloud point of the additized fuels was compared to that of the unadditized fuels. The results of these tests are shown in the Table below.

TABLE

| Additive Effects on the Cloud Point of Diesel Fuel | | |
|---|---|---|
| | Decrease in Cloud Point (°F.) | |
| Additive | Diesel Fuel 1 | Diesel Fuel 2 |
| A | 2.9 | 2.9 |
| B | 2.5 | 2.9 |
| C | 2.5 | 2.2 |
| D | 2.5 | 2.7 |
| E | 1.5 | 1.3 |

These new additives, when used in diesel fuels, lower the cloud point of the fuel. Cloud point is one of the properties by which the suitability of diesel fuels for low temperature use is assayed. Currently low temperature properties of diesel fuels are improved by dilution of the diesel fuels with kerosene. Additives of this type may provide the means to improve the low temperature properties of diesel fuels without the use of kerosene, or with a lesser amount of kerosene.

What is claimed is:

1. A fuel composition comprising a major amount of a liquid hydrocarbyl fuel and a minor amount of from about 0.001% to about 10% by weight based on the total weight of the composition of an additive product of reaction obtained by reacting a 1-alkyl-N,N-dialkyl aminoalcohol with polymers and/or oligomers containing maleic anhydride.

2. The composition of claim 1 where the aminoalcohol is derived from N,N-dialkylated amines and 1,2-epoxyalkanes.

3. The composition of claim 1 where the 1-alkyl-N,N-dialkyl aminoalcohol is a 1-alkyl-N,N-dialkyl ethanolamine.

4. The composition of claim 2 where the epoxyalkanes contain from about 16 to 24 carbon atoms.

5. The composition of claim 1 where the polymers and/or oligomers range in size from oligomeric to about 200,000 molecular weight.

6. The composition of claim 2 where the alkylated amine is di(hydrogenated tallow) amine and the epoxyalkane is 1,2-epoxy octadecane.

7. The composition of claim 2 where the polymer containing maleic anhydride is a copolymer of hexadecene and maleic anhydride.

8. The composition of claim 2 where the polymer containing maleic anhydride is a copolymer of butyl acrylate and maleic anhydride.

9. The composition of claim 2 where the polymer containing maleic anhydride is a copolymer of stearyl methacrylate and maleic anhydride.

10. The composition of claim 2 where the polymer containing maleic anhydride is a copolymer of styrene and maleic anhydride.

11. The composition of claim 2 where the polymer containing maleic anhydride is a copolymer of ethylene and maleic anhydride.

12. The composition of claim 1 where said product is a mixture containing at least one structure exemplified as follows:

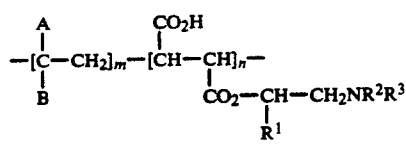

Where
A=hydrogen, Me;
B=hydrogen, $C_1$ to about $C_{60}$ hydrocarbyl, carboxyhydrocarbyl or phenyl group;
$R^1$, $R^2$, $R^3$, each are independently about $C_1$ to about $C_{60}$ alkyl groups;
m, n=2 to 1000, independently.

13. The composition of claim 1 where the liquid hydrocarbyl fuel is a liquid hydrocarbon combustion fuel selected from distillate fuels and fuel oils.

14. The composition of claim 13 where said fuel oils are selected from fuel oil nos. 1, 2, and 3, and diesel fuel oil and jet combustion fuels.

15. The composition of claim 13 where the fuel is a fuel oil selected from fuel oil nos. 1, 2 and 3 and suitable for use as heating oil.

16. The composition of claim 14 where the fuel oil is a diesel fuel oil.

17. The composition of claim 14 where the fuel oil is a jet combustion fuel.

18. A concentrate solution suitable for use in preparing liquid hydrocarbyl fuels comprising an inert solvent and an additive product as described in claim 1 dissolved therein.

19. The solution of claim 18 comprising a total volume of 100 ml having dissolved therein about 10 g of said additive product.

20. The solution of claim 18 wherein said solvent is a hydrocarbon solvent.

21. The solution of claim 20 wherein said solvent is xylene or mixed xylenes.

22. A method of improving the low temperature properties of a liquid hydrocarbyl fuel comprising adding thereto a minor amount of an additive product as described in claim 1.

23. The method of claim 22 wherein said minor amount varies from about 0.001 wt % to about 10 wt % based on the total weight of the composition.

* * * * *